United States Patent Office 3,408,342
Patented Oct. 29, 1968

3,408,342
STABILIZED POLY(ARYLENE SULFIDES)
Elizabeth G. Horvath, Bartlesville, Okla., and David A. Frey, Woodstock, Ill., assignors to Phillips Petroleum Company, a corporation of Delaware
No Drawing. Filed Aug. 31, 1965, Ser. No. 484,091
13 Claims. (Cl. 260—45.9)

ABSTRACT OF THE DISCLOSURE

The discoloration of poly(arylene sulfide) resins is reduced or prevented by contacting the resins with a hydroxy-substituted amine.

This invention relates to stabzilized poly(arylene sulfides). In one aspect, it relates to poly(arylene sulfides) treated with hydroxy-substituted amines to inhibit discoloration. In another aspect, it relates to compositions of poly(arylene sulfides) and hydroxy-substituted amines resistant to discloration. In another aspect, it relates to poly(arylene sulfides) resistant to heat induced discloration by virtue of treatment with hydroxy-substituted amines. In still another aspect, it relates to treating a poly(arylene sulfide) polymer with a color inhibitor by contacting it with a solution of the color inhibitor. In yet another aspect, it relates to inhibition of additional discoloration of a heat treated poly(arylene sulfide) upon further heat treatment by treating the previously heat treated poly(arylene sulfide) with a hydroxy-substituted amine. In another aspect, it relates to inhibiting color formation in poly(arylene sulfide) by contacting the poly(arylene sulfide) with a hydroxy-substituted amine, in the liquid or vapor state, at elevated temperatures. In yet another aspect, it relates to reducing the color of a discolored poly(arylene sulfide) by contacting it with a hydroxy-substituted amine.

Poly(arylene sulfides) which have not been subjected to elevated temperatures, and which do not contain groups capable of imparting color to the polymers are generally white or light colored. However, during high temperature curing, molding, or other heat treatment, the polymers often undergo considerable darkening. This darkening occurs even though air is excluded during the high temperature treatment. For example, although poly(p-phenylene sulfide) does not discolor when subjected to temperatures up to about 290° C. for one hour in a sealed, evacuated container, the polymer does become gray-brown when heated at 365° C. under the same conditions. Since it is frequently desirable to cure these polymers at temperatures as high as 425° C., this curing will result in an undesirable coloration of white or nearly white polymers. The term "curing" as used herein refers to heat treatment of the polymer wherein the molecular weight of the polymer is thus increased.

Furthermore, even cured polymers, i.e. polymers whose molecular weight has been increased by heating and which have been discolored thereby, which are subjected to later heat treatment for the purpose of molding or coating, will undergo even further discoloration. This discoloration is esthetically undesirable, and limits the application of these resins in certain specific instances.

It is therefore an object of this invention to provide a method of treating poly(arylene sulfide) resins to reduce their discoloration tendencies. It is a further object of this invention to provide a poly(arylene sulfide) composition with reduced tendency to discolor during heat treatment. It is another object of this invention to provide a cured poly(arylene sulfide) resin of reduced coloration. It is yet another object of this invention to provide a method for treating poly(arylene sulfide) polymers with hydroxy-substituted amines to prevent their subsequent discoloration. It is yet another object of this invention to provide a stabilized poly(arylene sulfide) composition. It is yet another object of this invention to reduce the color of a poly(arylene sulfide) darkened by previous heat treatment.

These and other objects of this invention are accomplished by contacting the polymer with a hydroxy-substituted amine having the general formula

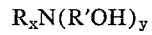

$$R_xN(R'OH)_y$$

wherein R is selected from the group consisting of hydrogen, alkyl, aryl, cycloalkyl, alkaryl, and aralkyl radicals containing 1 to 8 carbon atoms; R' is an alkylene radical containing 2 to 6 carbon atoms, $x$ is an integer from 0 to 2, and $y$ is equal to $3-x$.

The discoloration of the polymer which would normally occur during heating is therefore inhibited by the presence of a hydroxy-substituted amine during heating, and discoloration already present is reduced.

Some specific amines which are suitable for the practice of our invention are:

2-aminoethanol (ethanolamine)
1-amino-2-propanol
2-amino-1-propanol
4-amino-1-butanol
3-amino-2-pentanol
2-methyl-5-amino-1-pentanol
2,2'-iminodiethanol (diethanolamine)
3,3'-iminodi-1-propanol
1,1'-iminodi-2-butanol
2,2'-iminodi-1-hexanol
2,2',2''-nitrolotriethanol (triethanolamine)
1,1'1''-nitrilotri-2-propanol (triisopropanolamine)
2,2',2''-nitrilotri-1-butanol
1,1',1''-nitrilotri-2-hexanol
2-methylaminoethanol
1-diethylamino-2-propanol
2-isobutylamino-1-butanol
1-hexylamino-2-pentanol
6-dioctylamino-1-hexanol
2-cyclohexylaminoethanol
1-anilino-2-propanol
2-p-toluidino-1-butanol
2-benzylaminoethanol
2,2'-(methylimino)diethanol
1,1'-(butylimino)di-2-butanol
2,2'-(octylimino)di-1-hexanol
2,2'-(cyclohexylimino)diethanol
1,1'-(phenylimino)di-2-propanol
2,2'-(o-tolylimino)-di-1-propanol
2,2'-(benzylimino)diethanol.

The process of our invention can be applied to either cured or uncured polymers, and is effective in curing, molding, or coating techniques. Thus, when an uncured poly(arylene sulfide), which is usually white or of light color, is subjected to a heat treatment, as in curing, molding, or coating techniques, the presence of a hydroxy-substituted amine of the type described above prevents or reduces the discoloration which normally occurs during such heat treatment. Furthermore, an uncured poly-(arylene sulfide) which has developed a color, e.g., in molding operations, can be made lighter in color by the process of this invention.

The process of our invention is also useful in treatment of previously cured poly(arylene sulfides), which normally are quite dark in color. When such cured polymers are subjected to heat treatment, as in molding or coating techniques, the presence of the hydroxy-substituted amine causes the polymer to become lighter in color than either the original cured polymer, or the cured polymer with subsequent heat treatment in the absence of the amine.

The concentration of the hydroxy-substituted amine can vary over a wide range. In general, the amine will be employed in a concentration from 2 to 20 weight percent, and generally 4 to 10 weight percent will be satisfactory, based upon the weight of the polymer.

The hydroxy-substituted amine can be incorporated in the polymer prior to heat treatment in any convenient manner. For example, the hydroxy-substituted amine can be added as such to the polymer, and the resulting mixture can be agitated in any suitable manner to achieve good mixing. A particularly convenient manner of introducing the hydroxy-substituted amine into the polymer is the addition of said amine dissolved in a volatile solvent such as hexane, benzene, ether, acetone, methanol, and the like, with subsequent volatilization of the solvent.

As a further embodiment of our invention, heat treatment of the polymer and color stablization or reduction with the hydroxy-substituted amine can be accomplished concurrently by contacting the polymer with the hydroxy-substituted amine at elevated temperatures, e.g., at temperatures of about 200–400° C., preferably about 250–370° C., for a period of about 30 minutes to about 12 hours, preferably about 1 hour to about 6 hours.

EXAMPLE I

A mixture of 720 g. of sodium sulfide nonahydrate and 1000 ml. of N-methyl-2-pyrrolidone was heated until 542 g. of distillate was collected, this treatment being for the purpose of removing water of hydration from the sodium sulfide nonahydrate. The residual solution was then transferred to a rocking autoclave, and 407 g. of p-dichlorobenzene in 200 ml. of N-methyl-2-pyrrolidone was added. The contents of the autoclave were then heated at 450° F. for 1½ hours, after which 36 g. of 1,2,4-trichlorobenzene in 200 ml. of N-methyl-2-pyrrolidone was added. The resulting mixture was heated at 500° F. for 2 hours. The reaction mixture was filtered, and the solid polymer was washed with water and with acetone. The washed polymer, after drying in a vacuum oven, weighed 287 g.

EXAMPLE II

To each of three 65 g. portions of the polymer prepared in Example I was added 3.25 g. of ethanolamine, diethanolamine, or triisopropanolamine dissolved in 500 ml. of ether. About 50 ml. of ethanol previously had been added to the solution of diethanolamine to aid in dissolving the amine. Each of the polymer samples was slurried in the solution of amine, after which the solvent was evaporated to leave a film of the amine on the polymer. Each of the three amine-treated polymer samples, as well as an untreated polymer sample serving as a control, was molded at 625° F. under a pressure of 30,000 p.s.i.g. for 30 minutes, and then cooled rapidly. The resulting molded, untreated polymer sample was dark gray. In contrast, each of the molded, amine-treated polymer samples was much lighter in color, each sample being tan or medium gray.

EXAMPLE III

To 65 g. of polymer prepared in a manner similar to that described in Example I was added 3 g. of triethanolamine dissolved in about 500 ml. of methanol. The polymer was slurried in the solution of amine, after which the solvent was evaporated to leave a film of the amine on the polymer. The amine-treated polymer sample, as well as an untreated polymer sample serving as a control, was molded as in Example II. The resulting molded, untreated polymer sample was brown. In contrast, the amine-treated sample was beige.

EXAMPLE IV

A portion of the brown, molded, untreated polymer sample in Example III was heated in the liquid phase of boiling triethanolamine, at atmospheric pressure, for approximately 2 hours. The color of the polymer was reduced.

EXAMPLE V

A mixture of 720 g. of sodium sulfide nonahydrate and 1000 ml. of N-methyl-2-pyrrolidone was heated until 500 ml. of distillate was collected, thereby removing water of hydration from the sodium sulfide nonahydrate. The residue was then transferred to a rocking autoclave, and 441 g. of p-dichlorobenzene was added. The contents of the autoclave were then heated at 440° F. for 17 hours. The reaction mixture was filtered, and the solid polymer, poly(p-phenylene sulfide), was washed with methanol and with water. The washed polymer, after drying in a vacuum oven, weighed 320 g. A 20 g. portion of the dried polymer was then subjected to a curing treatment in which the polymer was heated at 325° C. for 6 hours in a nitrogen atmosphere, then rapidly cooled in cold water and dried.

EXAMPLE VI

A 4 g. sample of the cured poly (p-phenylene sulfide) prepared in Example V was heated in 135 g. of triethanolamine at 275–285° C. At this temperature the polymer had melted but did not dissolve. When the mixture was cooled to room temperature, the polymer solidified. The color of the resulting polymer was lighter than that of the original cured polymer sample.

The process of our invention is applicable to poly(arylene sulfides) formed by any technique. It can be used, for example, with the resins manufactured as described in U.S. Patent 2,513,188 prepared by reacting mixtures of p-dichlorobenzene and 1,2,4-trichlorobenzene with sulfur and a metal sulfide at fusion temperatures. It can also be used with resins manufactured by the method described in British Patent 962,941 wherein metal salts of halothiophenols are heated at a polymerizing temperature. It is especially useful with polymers produced by reacting anhydrous sodium sulfide with polyhalo substituted cyclic compounds in polar organic solvents, as disclosed in Ser. No. 327,143, filed Nov. 27, 1963, now U.S. Patent No. 3,354,129. This process may be used with the linear polymers formed by use of dihalo aromatic compounds, or with cross linked polymers wherein polyhalo aromatic compounds are added to the polymer to aid cross linking.

Reasonable variation and modification are possible within the scope of our invention, the essence of which is that poly(arylene sulfides) are contacted with hydroxy-substituted amines to reduce discoloration.

We claim:

1. The composition of matter comprising a poly(arylene sulfide) and a compound of the formula $$R_xN(R'OH)_y$$

wherein R is selected from the group consisting of hydrogen, alkyl, aryl, cycloalkyl, alkaryl, and aralkyl radicals containing 1 to 8 carbon atoms; R' is an alkylene radical containing 2 to 6 carbon atoms; x is an integer from 0 to 2; and y is equal to 3−x.

2. The composition of matter of claim 1 comprising a poly(arylene sulfide) and an amine selected from ethanolamine, diethanolamine, triethanolamine and triisopropanolamine.

3. The composition of claim 1 wherein the amount of said compound ranges from about 2 to about 20 weight percent of the poly-arylene sulfide) resin.

4. The composition of matter comprising a (polymer of arylene) polyphenylene sulfide and 2–20 weight percent of a compound of the formula:

$$R_xN(R'OH)_y$$

wherein R is selected from the group consisting of hydrogen, alkyl, aryl, cycloalkyl, alkaryl, and aralkyl radicals containing 1 to 8 carbon atoms; R' is an alkylene radical containing 2 to 6 carbon atoms; x is an integer from 0 to 2; and y is equal to 3−x.

5. The method of reducing discoloration of discolored poly(arylene sulfide) resins comprising contacting said resins with a compound of the general formula $$R_xN(R'OH)_y$$

wherein R is selected from the group consisting of hydrogen, alkyl, aryl, cycloalkyl, alkaryl, and aralkyl radicals containing 1 to 8 carbon atoms; R' is an alkylene radical containing 2 to 6 carbon atoms; $x$ is an integer from 0 to 2; and $y$ is equal to $3-x$.

6. The method of claim 5 wherein said contacting occurs prior to curing of said resins.

7. The method of claim 5 wherein said contacting occurs subsequent to curing of said resins.

8. The method of claim 5 wherein said contacting occurs by placing said resins in liquid amine at elevated temperatures.

9. The method of claim 5 for reducing discoloration of discolored poly(arylene sulfides) comprising contacting said poly(arylene sulfides) with triethanolamine, ethanolamine, diethanolamine and triisopropylamine.

10. The method of preventing discoloration of poly(arylene sulfide) resins which comprises contacting said resins with a volatile solvent having dissolved therein at least one amine of the general formula $R_xN(R'OH)_y$ wherein R is selected from the group consisting of hydrogen, alkyl, aryl, cycloalkyl, alkaryl, and aralkyl radicals containing 1 to 8 carbon atoms, R' is an alkene radical containing 2 to 6 carbon atoms; $x$ is an integer from 0 to 2; and $y$ is equal to $3-x$, and heating to volatilize and remove said solvent from said resin.

11. The method of claim 10 wherein said resin is polyphenylene sulfide, said solvent is selected from ether, ethanol and methanol, and said amine is selected from ethanolamine, diethanolamine, triethanolamine, and triisopropanolamine.

12. The method of reducing discoloration of poly(arylene sulfide) resins and preventing additional discoloration during heat treatment comprising heat treating said poly(arylene sulfide) by contacting same with a boiling amine of the general formula $R_xN(R'OH)_y$, wherein R is selected from the group consisting of hydrogen, alkyl, aryl, cycloalkyl, alkaryl, aralkyl radicals containing 1 to 8 carbon atoms; R is an alkene radical containing 2 to 6 carbon atoms; $x$ is an integer from 0–2; and $y$ is equal to $3-x$.

13. The method of claim 12 wherein said poly(arylene sulfide) is polyphenylene sulfide and said amine is triethanolamine.

References Cited

UNITED STATES PATENTS

| | | | |
|---|---|---|---|
| 2,513,188 | 6/1950 | Macallum | 260—79 |
| 2,538,941 | 6/1950 | Macallum | 260—79 |
| 3,324,087 | 6/1967 | Smith et al. | 260—79 |
| 3,331,812 | 7/1967 | Lee et al. | 260—409 |

DONALD E. CZAJA, *Primary Examiner.*

H. E. TAYLOR, *Assistant Examiner.*